United States Patent
Tohyama

(10) Patent No.: US 7,232,998 B2
(45) Date of Patent: Jun. 19, 2007

(54) BOLOMETER-TYPE INFRARED SOLID-STATE IMAGE SENSOR

(75) Inventor: Shigeru Tohyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/434,065

(22) Filed: May 9, 2003

(65) Prior Publication Data

US 2003/0209668 A1    Nov. 13, 2003

(30) Foreign Application Priority Data

May 10, 2002    (JP)    ............................. 2002-135780

(51) Int. Cl.
*G01J 5/00*    (2006.01)
(52) U.S. Cl. .................................. 250/338.1
(58) Field of Classification Search ............. 250/338.1, 250/338.4, 370.01
See application file for complete search history.

(56) References Cited

U.S. PATENT DOCUMENTS

| | | | | |
|---|---|---|---|---|
| 5,698,852 A | * | 12/1997 | Tanaka et al. | ............... 250/332 |
| 5,914,488 A | * | 6/1999 | Sone | ........................ 250/338.1 |
| 6,329,696 B1 | * | 12/2001 | Tanaka | ........................ 257/419 |
| 6,441,368 B1 | * | 8/2002 | Grinberg et al. | ............ 250/239 |

FOREIGN PATENT DOCUMENTS

| | | | |
|---|---|---|---|
| JP | 2-281703 A | | 11/1990 |
| JP | 8105794 | * | 12/1997 |
| JP | 2000-2585 A | | 1/2000 |
| JP | 2000 346704 A | | 12/2000 |
| JP | 2001-255203 A | | 9/2001 |
| JP | 2002-259798 A | | 9/2002 |
| WO | WO 00/37906 A1 | | 6/2000 |

OTHER PUBLICATIONS

H. Wada et al., "Design and Performance of 256 × 256 Bolometer-Type Uncooled Infrared Detector", *SPIE*, vol. 3379, Apr. 1998, pp. 90-100.

* cited by examiner

*Primary Examiner*—Albert J. Gagliardi
*Assistant Examiner*—Marcus Taningco
(74) *Attorney, Agent, or Firm*—Sughrue Mion, PLLC

(57) ABSTRACT

A bolometer-type infrared solid-state image sensor has a plurality of infrared detecting elements provided above the substrate, which has diaphragm spacing from the substrate and supported by beams. The diaphragm has a bolometer thin film, electrodes arranged on the both end of the bolometer thin film, an upper layer protective film and a lower layer protective film, which are formed so as to sandwich and cover said bolometer thin film and the electrodes, and concave or convex sections formed on said lower layer protective film. The bolometer thin film is formed on the sides of the concave or convex sections. The beams includes wiring material and insulating protective films surrounding the wiring material.

11 Claims, 3 Drawing Sheets

BOLOMETER-TYPE INFRARED SOLID-STATE IMAGE SENSOR

BACKGROUND OF THE INVENTION

1. Technical Field of the Invention

The present invention relates to a thermal infrared solid-state image sensor having thermal isolation, particularly to a bolometer-type infrared solid-state image sensor.

2. Description of the Related Art

Conventionally, the bolometer-type infrared solid-state image sensor of this kind has adopted a structure in which diaphragm simply sandwiched a bolometer thin film with an insulating protective film in a plurality of infrared detecting elements, which consist of the diaphragm spacing above a semiconductor substrate and supported by beams. Alternatively, the image sensor had comprised an infrared absorption film on a side of the insulating protective film, to which light is made incident. Then, to obtain an infrared image, the infrared detecting elements have been arranged in two-dimensionally above the semiconductor substrate and a readout circuit corresponding to the infrared detecting elements has been formed on the semiconductor substrate.

To obtain a highly defined image by such a bolometer-type infrared solid-state image sensor, the number of infrared detecting elements above the semiconductor substrate need to be increased. However, the infrared solid-state image sensor becomes large if the number of elements is simply increased without changing the sizes of the infrared detecting elements. Therefore, reduction of the sizes of infrared detecting elements is required to achieve high definition.

Dimension reduction of the bolometer thin film is necessary for the reduction of the sizes of the infrared detecting elements. A vanadium oxide thin film is generally used as the bolometer thin film. Mr. Wada et al, after having used the vanadium oxide thin film as the bolometer thin film and inspected the relationship between the bolometer thin film dimension and noise occurred in the film, reported that the noise in the bolometer thin film had increased with the reduction of volume of the bolometer thin film (refer to SPIE Vol. 3379, p. 90, 1998). 1/f noise makes up most of the noise component, the 1/f noise is inversely proportional to the square root of the sum of free carriers (equation reported by Mr. Wada, et al), and thus the above-described noise characteristic appears. In other words, there has existed a problem that the noise occurred in the bolometer thin film increased when the size of infrared detecting element was reduced to achieve high definition.

To solve the problem, Mr. Hata and Mr. Nakagi (Japanese Patent Laid-open No. 2000-346704 publication) proposed a bolometer-type infrared detecting element whose microfabrication can be realized without increasing the noise. Description will be made for the conventional example by Mr. Hata and Mr. Nakagi using FIG. 1.

FIG. 1 is a cross-sectional structural view of the bolometer-type infrared detecting element that forms a unit pixel constituting an infrared solid-state image sensor. A plurality of the bolometer-type infrared detecting elements are formed above a semiconductor substrate 10 so as to form an array state. The infrared detecting elements are characterized by comprising a bolometer section 13 of a multi-layer structure. The bolometer section 13 is one in which a first bolometer film 13a and a second bolometer film 13b have been laminated via an insulative junction film 14, and the both bolometer films consist of vanadium oxide.

The bolometer section 13 is arranged so as to bridge over a first electrode 12a and a second electrode 12b, which are formed on a support film 11. Further, the bolometer section 13 is supported by a support leg 1B, and thermally isolated from the semiconductor substrate 10. The junction film 14 that lies between the first and the second bolometer films 13a, 13b is provided with two through holes 15. The two through holes 15 are directly positioned above the electrodes 12a, 12b respectively, and vanadium oxide is filled in the both through holes 15. The first and second bolometer films 13a, 13b are electrically connected to each other via vanadium oxide filled in the through holes 15, and the bottom surface of the first bolometer film 13a is connected to the both first and second electrodes 12a, 12b, so that the first and second bolometer films 13a, 13b are parallelly connected between the first and second electrodes 12a, 12b. In addition, as shown in FIG. 1, the bolometer-type infrared detecting element includes insulating film 16, infrared absorbing film 17, support layer 18, and wiring layer 19. Alternatively, there are cases where the first and second bolometer films 13a, 13b are connected in series. With such a lamination structure, it is possible to increase the volume of the bolometer film leaving the two-dimensional size thereof as it is, and the noise can be reduced.

As a method of increasing the volume of the bolometer film leaving the two-dimensional size thereof as it is, simply increasing the thickness of the bolometer film is an option. However, Mr. Hata and Mr. Nakagi (Japanese Patent Laid-open No. 2000-346704 publication) verified that the noise cannot be reduced by such a volume increasing method. It is understood that this is because the free carriers that cannot be effectively used increase as the film thickness becomes thicker and the increase of the sum of effective free carriers equal to the volume increase cannot be obtained. Consequently, the above-described publication adopted the structure where the thin bolometer films 13a, 13b were laminated via the insulative junction film 14 in order to obtain the increase of the sum of effective free carriers equal to the volume increase.

Generally, the bolometer film made of metal oxide such as vanadium oxide is thermally treated in a reduction atmosphere to optimize a resistance temperature coefficient, a sheet resistance, or the like. In the above-described conventional example (Japanese Patent Laid-open No. 2000-346704 publication), the bolometer films are in a laminated structure, so that there exists a problem that thermal treatment to the bolometer film of the upper layer affects the bolometer film of the lower layer and its characteristic is changed to deviate from the optimal state. Further, since there is little provability that the change amount becomes uniform between the pixels, another problem occurs that characteristic dispersion between pixels increases.

Furthermore, there exists the following problem on the point that, in the foregoing conventional example, electrical connection between the bolometer film of the upper layer and the bolometer film of the lower layer is made by the contact between the bolometer films. Specifically, although it is desirable that the bolometer films have a high resistance temperature coefficient, the resistance temperature coefficient and the resistivity are in a proportional relationship when the film material is the same. Accordingly, it is desirable that the resistivity be as high as possible from the viewpoint of the resistance temperature coefficient. However, the higher the resistivity becomes, the more difficult to obtain ohmic characteristic of the junction section. Particularly, this is even more difficult in the metal oxide such as vanadium oxide because it has stronger semiconductor characteristic in the higher resistivity. Thus, there also exists a problem that a high resistance temperature coefficient and a good electrical characteristic cannot be compatible in the conventional example.

SUMMARY OF THE INVENTION

The object of the present invention is to provide a bolometer-type infrared solid-state image sensor in which the bolometer film is allowed to have the optimal characteristic in spite of a low noise and characteristic dispersion between pixels can be made small.

To achieve the above-described object, the bolometer-type infrared solid-state image sensor of the present invention comprises a substrate, and a plurality of infrared detecting elements above the substrate, which essentially consist of diaphragm spacing from the substrate and supported by beams. The diaphragm comprises a bolometer thin film, electrodes arranged on the both end thereof, an upper layer protective film and a lower layer protective film, which are formed so as to sandwich and cover the bolometer thin film and the electrodes, and concave/convex sections that are formed on the lower layer protective film and the bolometer thin film is formed on the sides thereof. The beams comprise wiring material and insulating protective films surrounding the wiring material.

Note that the concave/convex sections can be provided by forming a plurality of separate convex sections on the lower layer protective film, or also can be provided by forming a convex portion having a cross-section of an inverted T-shape, in which areas between a plurality of convex sections are partially connected on the bottom into a unit.

The present invention can have a constitution where each of a plurality of the convex sections or concave sections is formed extending in a direction that crosses an electric current direction in the bolometer thin film, a constitution where the section is formed extending in a direction approximately parallel to the electric current direction in the bolometer thin film, a constitution where either a plurality of the convex sections or concave sections are formed on the lower layer protective film in a dotted manner (said sections are closely gathered but isolated from each other), or a constitution where these are combined.

Further, in the present invention, it is preferable that the convex sections are formed by insulating material capable of performing selective etching to the lower layer protective film.

As described, in the bolometer-type infrared solid-state image sensor of the present invention, the bolometer thin film is formed on the lower layer protective film on which the concave/convex sections have been formed, so that the volume increase equivalent to the thin film generated on the sidewalls of the concave/convex sections can be obtained. If a plurality of the convex sections are provided in a simple stripe shape as dense as possible with a constant line-and-space in a region between the electrodes on the both bolometer thin film, the volume increase is determined by a ratio of the height of convex sections to a pitch thereof. The volume increases as the ratio of height increases, where the volume increase is approximately twice and approximately three times when the ratio is [height 1: pitch 2] and [height 1: pitch 1] respectively. The low noise can be achieved with the volume increase of the bolometer thin film.

Further, in the present invention, since the bolometer thin film is made of a single layer, process of the thermal treatment only for the thin film to control the resistance temperature coefficient, the sheet resistance, or the like is enough. Therefore, this thermal treatment can optimize the resistance temperature coefficient, the sheet resistance, or the like, and thus solving the problem that the film characteristic deviates from the optimal state to increase characteristic dispersion between the pixels by a plural times of thermal treatment. In addition, since the contact between bolometer thin films does not exists, it is not necessary to set the bolometer thin film to a low resistivity taking the ohmic characteristic into consideration. Consequently, it is possible to make the resistance temperature coefficient be high and a good electrical characteristic can be maintained.

THE DETAILED DESCRIPTION OF THE PREFERRED EMBODIMENTS

The preferred embodiments of the bolometer-type infrared solid-state image sensor according to the present invention will be described in detail using the accompanying drawings.

First Embodiment

Figure 1:
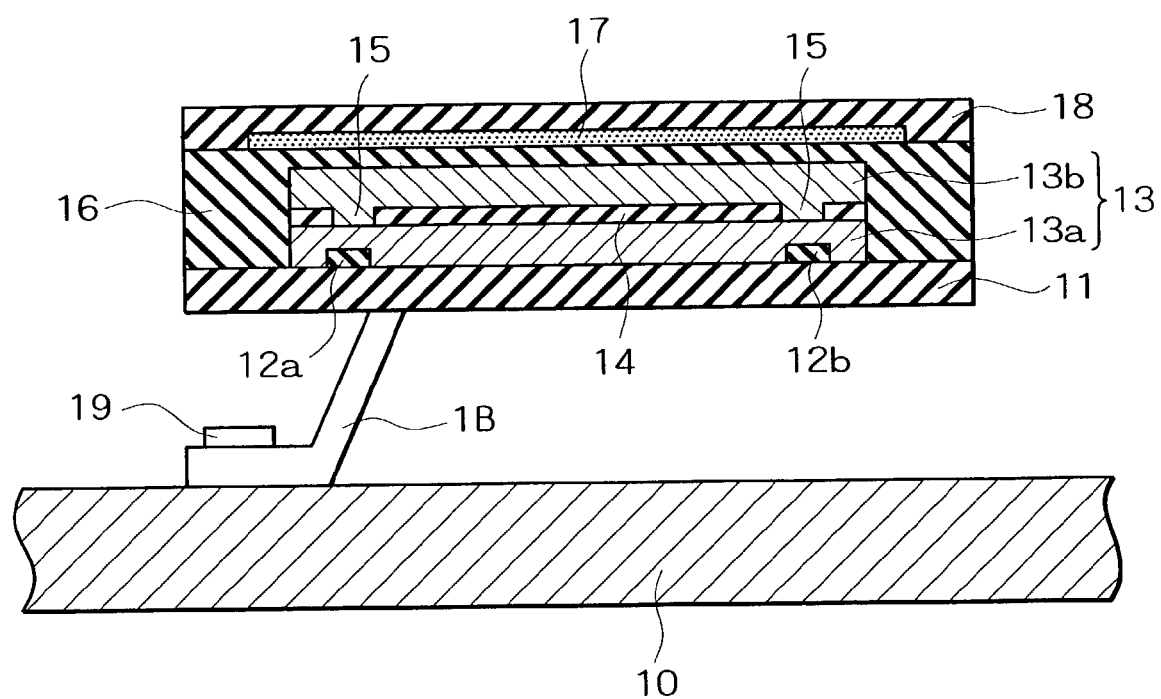
FIG. 1 is a cross-sectional structural view of a conventional bolometer-type infrared detecting element (Japanese Patent Laid-open No. 2000-346704).
Figure 2:
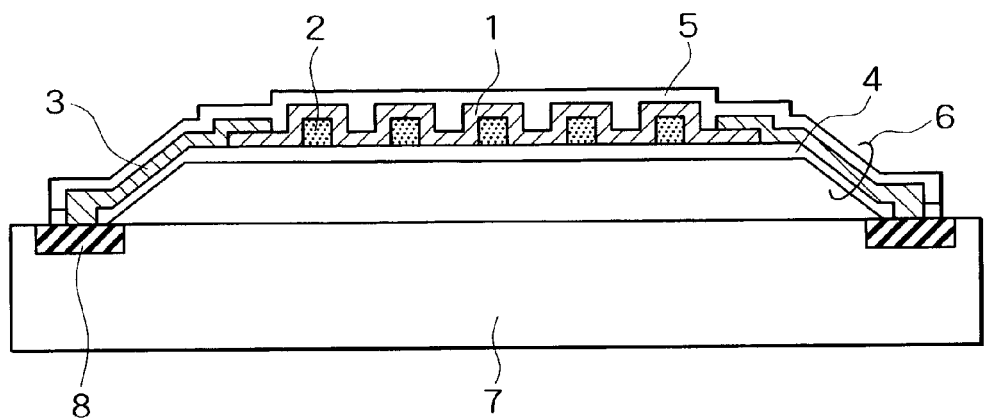
FIG. 2 is a schematic cross-sectional structural view of a unit pixel of the bolometer-type infrared solid-state image sensor according to a first embodiment of the present invention.
Figure 3:
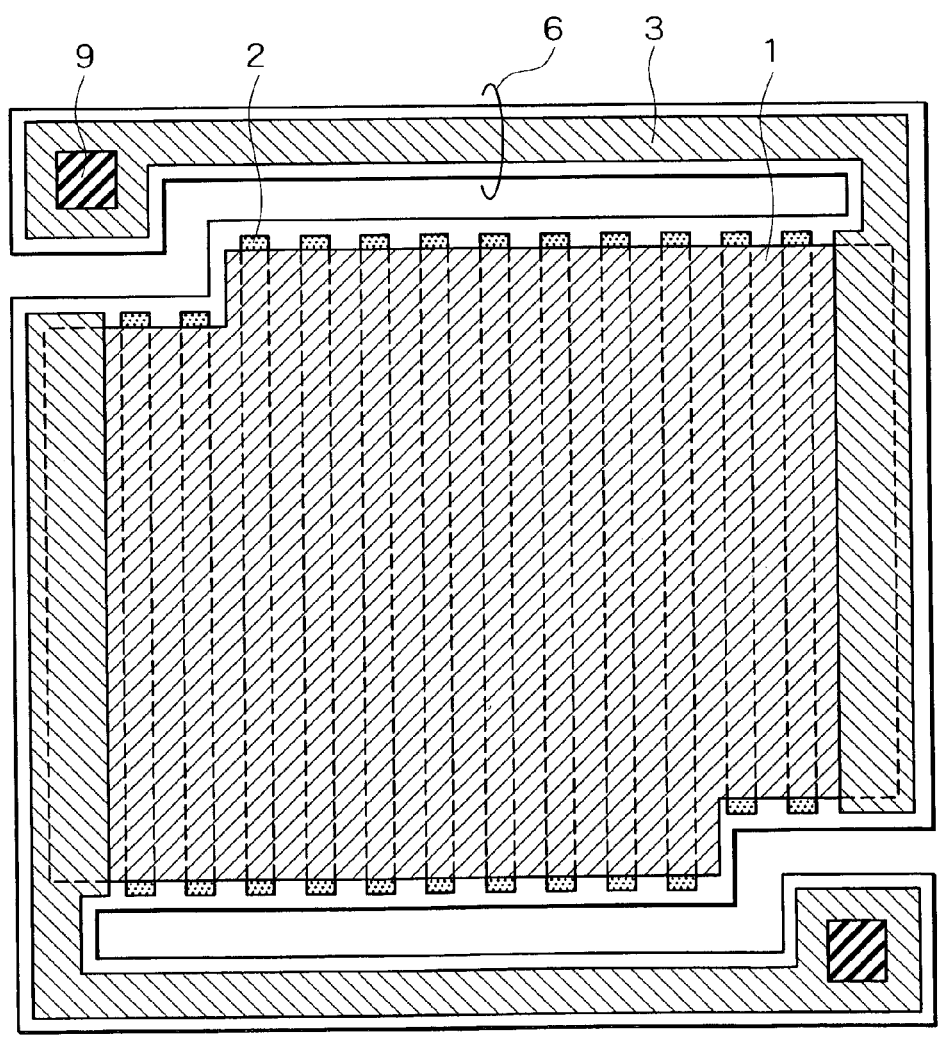
FIG. 3 is a plan view of diaphragm that is a light-receiving section of the unit pixel of the bolometer-type infrared solid-state image sensor according to the first embodiment of the present invention.

The bolometer-type infrared solid-state image sensor according to the first embodiment of the present invention will be described with reference to FIGS. 2 and 3. FIG. 2 is the schematic cross-sectional structural view of a unit pixel of the bolometer-type infrared solid-state image sensor according to the first embodiment of the present invention, and FIG. 3 is the plan view of the diaphragm that is the light-receiving section of the unit pixel. The bolometer-type infrared solid-state image sensor of the present invention is constituted by forming a plurality of the unit pixels in an array state.

Specifically, the diaphragm that is the light-receiving section stands with a self-sustaining manner in a region corresponding to one pixel of a semiconductor substrate 7, where a readout circuit has been fabricated and which is made of silicon and the like, as shown in FIG. 2, with a gap for heat isolation between the diaphragm and the semiconductor substrate 7 by two beam sections 6. Such a diaphragm structure can be formed by a well-known micromachine manufacturing technique using a sacrifice layer. The diaphragm has a structure where a lower layer protective film 4 and an upper layer protective layer film 5 sandwich a bolometer thin film 1, and wirings 3 which are electrically connected to both ends of the bolometer thin film 1 and which are fabricated in the beam sections 6 are led out to the readout circuit connection sections 8 and form electrical contacts 9 with the readout circuit connection sections 8.

Thus, the bolometer thin film 1 and the readout circuit are electrically connected to each other.

For example, the bolometer thin film 1 consists of vanadium oxide (such as $V_2O_3$ and $VO_x$) or titanium oxide ($TiO_x$) having the film thickness of approximately 50 to 200 nm. Both the lower layer protective film 4 and the upper layer protective film 5 consist of a silicon oxide film (SiO, $SiO_2$), a silicon nitride film (SiN, $Si_3N_4$), a silicon oxynitride film (SiON), or the like having the film thickness of approximately 100 to 500 nm. The wiring 3 consists of aluminum (Al), copper (Cu), gold (Au), titanium (Ti), tungsten (W), molybdenum (Mo), titanium-aluminum-vanadium (TiAlV), or the like having the film thickness of approximately 50 to 200 nm.

Note that the lower layer protective film 4 and the upper layer protective film 5, which constitute the beam sections 6 and the diaphragm, are drawn so as to link together with no ending, but two films formed in different process can be connected to constitute the films 4, 5.

As described, in the bolometer-type infrared solid-state image sensor of this embodiment, the bolometer thin film 1 is in a single layer and the electrical connection sections are only ohmic contact sections with the wiring 3, so that highly reliable contact characteristic can be easily obtained with good reproducibility.

In this embodiment, a plurality of convex sections 2 running in a stripe shape are provided on the lower layer protective film 4 in a direction that crosses the electric current direction of the bolometer thin film 1, and the bolometer thin film 1 is formed thereon. The convex sections 2 also consist of the silicon oxide film (SiO, $SiO_2$), the silicon nitride film (SiN, $Si_3N_4$), the silicon oxynitride film (SiON), or the like. To facilitate patterning on the lower layer protective film 4, it is desirable that the material of the convex section 2 be different from that of the lower layer protective film 4 to increase the selection ratio in etching process. The bolometer thin film 1, which is provided on the film 4 and the convex section 2, has an effective length in the electric current direction longer by a length equivalent to the sidewall regions of the convex sections 2, and a volume corresponding to the region is increased. The increased amount depends on the ratio of the pitch and the height of the convex section 2 rather than the absolute value thereof, where the volume increase is approximately twice and approximately three times when the ratio is [height 1: pitch 2] and [height 1: pitch 1] respectively.

This embodiment is particularly effective when the resistivity of the bolometer thin film material is relatively low. Specifically, since the effective length of the bolometer thin film 1 is made longer while the width is maintained unchanged, the electrical resistance of the bolometer thin film 1 increases. Then, by increasing the electrical resistance, a bias voltage restricted by self-heating can be increased, a signal output gain increases accordingly, and sensitivity thus can be increased. Because of the increase of the signal output in addition to the noise reduction by the volume increase, an S/N ratio can be further improved. For example, when the effective length is made to be twice to make the electrical resistance be twice, the bias voltage can be $\sqrt{2}$ times. Since the sensitivity is proportional to the bias voltage, the signal output also becomes $\sqrt{2}$ times. Because a noise level is $1/\sqrt{2}$ times to the volume increase amount as much as twice, the S/N ratio is improved to be twice.

Second Embodiment

Figure 4:
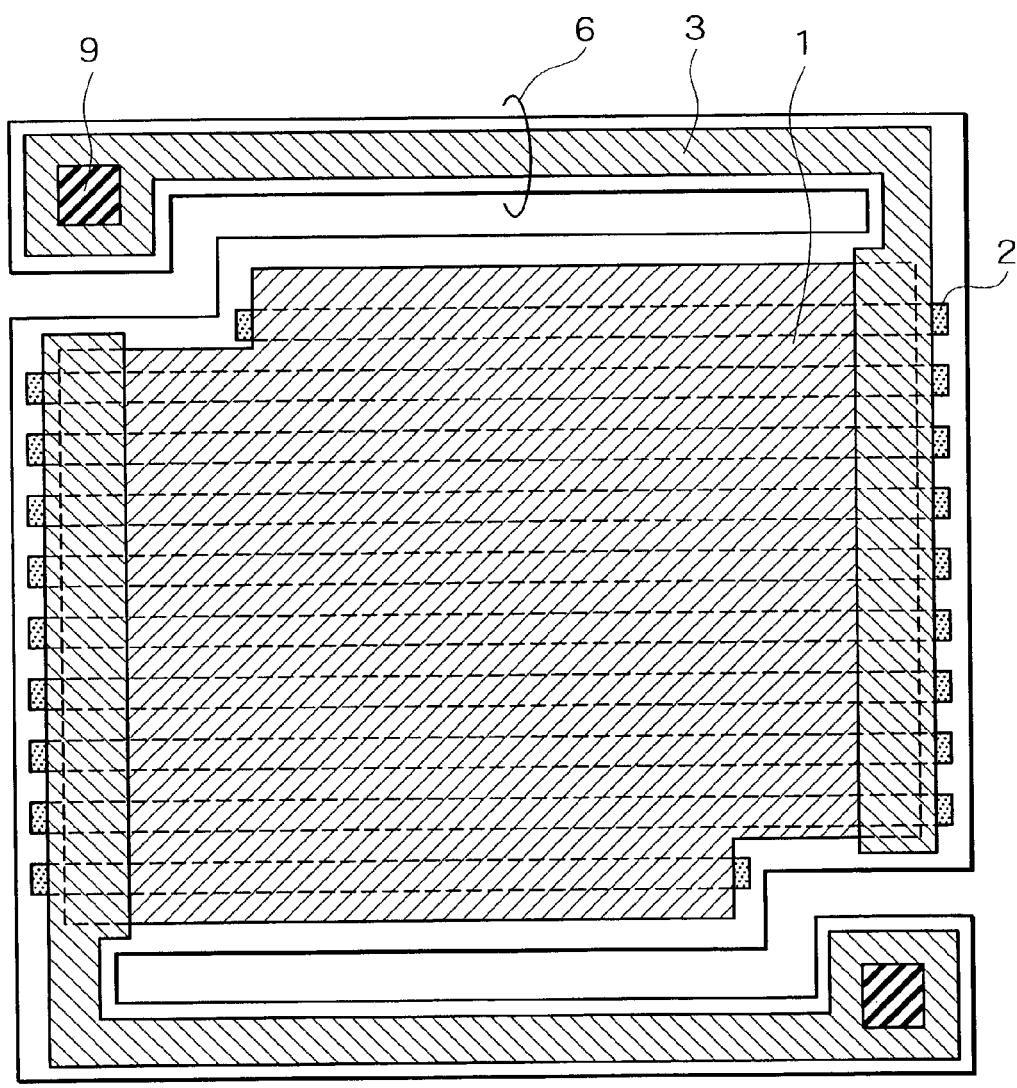
FIG. 4 is a plan view of diaphragm that is a light-receiving section of the unit pixel of the bolometer-type infrared solid-state image sensor according to a second embodiment of the present invention.

Next, the bolometer-type infrared solid-state image sensor according to the second embodiment of the present invention will be described referring to FIG. 4. FIG. 4 is the plan view of the diaphragm that is the light-receiving section of the unit pixel of the bolometer-type infrared solid-state image sensor according to the second embodiment of the present invention.

In the above-described first embodiment, the stripe-shaped convex sections 2 have been provided in the direction crossing the electrical current direction of the bolometer thin film 1. However, this embodiment is characterized in that a plurality of the convex sections 2 running in the striped-shape are provided in the same direction as the electrical current direction of the bolometer thin film 1 and the bolometer thin film 1 is formed thereon. Selection of material, dimensional conditions, and the like are the same as the first embodiment described above.

With such a structure, noise can be reduced by the volume increase of the bolometer thin film and dispersion of contact resistance can be restricted when the bolometer thin film consists of a single layer, similar to the above-described first embodiment. Note that this embodiment is suitable for the case where the resistivity of the bolometer thin film material is high because the electrical resistance reduces with the volume increase of the bolometer thin film.

Although description has been made as above for the embodiments in the cases where the formation direction of the convex sections 2 was in the direction that crosses the electrical current direction in the bolometer thin film 1 and where the formation direction was in the same direction as the electrical current direction in the bolometer thin film 1, the bolometer-type infrared solid-state image sensor of the present invention is not limited to them and a configuration having the convex sections 2 of more complex shape is applicable. For example, an image sensor having convex sections in which ones that cross the electrical current direction and ones having the same direction as the electrical current direction are combined, and furthermore, an image sensor having convex sections in which such convex sections are rotated by an arbitrary angle, 45 degrees for example, exert the similar effects. These image sensors, since the electrical resistance is unchanged even if the volume of the bolometer thin film 1 increases, may be used for the case where a bolometer thin film resistance may be as it is.

A structure where grooves are formed in the area of the convex sections 2 in FIGS. 3 and 4 is incorporated in the present invention because area around the grooves is in a convex section when the bottom of the groove is set as a reference. Further, the same applies to the case where grooves that cross the electric current and having the same direction as the electric current are combined, because island-shaped convex sections exist between the grooves if a perspective reference is changed. Since a convex and a concave are in a relative relationship making a counterpart to each other, the counterpart is automatically formed when either one is formed.

Furthermore, FIG. 2 shows the structure that the cross-section of the convex section 2 is in a rectangular shape. However, the present invention is not limited to this, and any structure in which the volume of the bolometer thin film 1 can be increased without increasing the plane size thereof is acceptable. For example, the convex sections 2 may be a triangular shape (or concave sections are formed in a v-shape or a u-shape). The shape of the cross-section can be appropriately set taking manufacturing facility of the convex sections 2 and the bolometer thin film 1 in consideration.

Further, description has been made for the case where the invention was applied for the bolometer-type infrared solid-state image sensor having the constitution that the readout circuit had been fabricated in the semiconductor substrate 7 that consists of silicon and the like. However, other types of bolometer-type infrared solid-state image sensor without the readout circuit or one formed not on the semiconductor substrate but on a flexible substrate are exist, and they can exert the effects similar to the above-described ones when the present invention is applied.

The results of an experiment, which was conducted to confirm the effects of the above-described embodiments of the present invention, will be described. A bolometer-type infrared solid-state image sensor having the pixel quantity of 320×240 and the pixel pitch of 37 μm was manufactured. The diaphragm that is the light-receiving section supported by two beam sections 6 is formed in an array state above a readout circuit IC fabricated in the Si substrate. The both lower layer protective film 4 and the upper layer protective film 5, which constitute the diaphragm, were formed by the Si nitride film having the film thickness of 300 nm. Further, the convex sections 2 were formed such that patterning had been performed to the Si oxide film having the film thickness of 500 nm in the striped-shape with a line of 0.4 μm and a gap of 0.6 μm in the direction that crosses the electric current direction in the bolometer thin film 1. Thus, 30 of the convex sections could be provided in a pixel. Vanadium oxide having the film thickness of 100 nm was used as the bolometer thin film 1. This causes the condition of [height 1: pitch 2] substantially. Furthermore, titanium-aluminum-vanadium (TiAlV) having the film thickness of 100 nm with low thermal conductivity was adopted as the wiring 3 in order to keep heat caused by infrared ray from radiating.

On the other hand, the identical bolometer-type infrared solid-state image sensor except it does not have the convex sections (conventional type) was manufactured at the same time, and the effects of the present invention were verified through comparing these sensors.

Since the bolometer-type infrared solid-state image sensor of the present invention has a vanadium oxide thin film resistance as substantially twice as that of the conventional type, a proper bias voltage that is approximately 1.4 times that of the conventional type was added, and the S/N ratio was evaluated. As a result, it was confirmed that the S/N ratio had been improved approximately twice that of the conventional type.

Further, when the in-plane uniformity of the both sensors was compared, no significant difference was shown because process (thermal hysteresis) added to the vanadium oxide thin film and the constitution of the contact section had no difference, and thus showing a good image. In other words, it was confirmed that a good electrical characteristic had been achieved.

As described above, according to the bolometer-type infrared solid-state image sensor of the present invention, since the bolometer thin film is formed on the lower layer protective film having a plurality of the convex sections or the convex section in which the areas between the convex sections are partially connected into a unit, the volume increase equivalent to the thin film generated on the sidewalls of the convex sections is obtained, and the low noise can be achieved.

Moreover, the bolometer thin film of the bolometer-type infrared solid-state image sensor of the present invention is formed by a single layer, and the constitution of the contact section can be highly reliable with good reproducibility as well. Accordingly, a good electrical characteristic with high in-plane uniformity can be obtained without increasing characteristic dispersion.

What is claimed is:

1. A bolometer-type infrared solid-state image sensor, comprising:
    a substrate; and
    a plurality of infrared detecting elements provided above the substrate, which has diaphragm spacing from the substrate and supported by beams,
    said diaphragm including:
    a bolometer thin film;
    electrodes arranged on the both end of the bolometer thin film;
    an upper layer protective film and a lower layer protective film, which are formed so as to sandwich and cover said bolometer thin film and said electrodes; and
    concave or convex sections formed on said lower layer protective film, on the sides of which said bolometer thin film is formed, wherein said concave or convex sections are formed of an insulator, or are electrically insulated from said bolometer thin film, and
    said beams including:
    wiring material; and
    insulating protective films surrounding the wiring material.

2. The bolometer-type infrared solid-state image sensor according to claim 1, wherein
    each of a plurality of said convex or concave sections is formed extending in a direction that crosses an electric current direction in said bolometer thin film.

3. The bolometer-type infrared solid-state image sensor according to claim 1, wherein
    each of a plurality of said convex or concave sections is formed extending in a direction approximately parallel to the electric current direction in said bolometer thin film.

4. The bolometer-type infrared solid-state image sensor according to claim 1, wherein
    a plurality of said convex or concave sections are formed on said lower layer protective film in a dotted manner.

5. A bolometer-type infrared solid-state image sensor, comprising:
    a substrate; and
    a plurality of infrared detecting elements provided above the substrate, which has diaphragm spacing from the substrate and supported by beams,
    said diaphragm including:
    a bolometer thin film;
    electrodes arranged on the both end of the bolometer thin film;
    an upper layer protective film and a lower layer protective film, which are formed so as to sandwich and cover said bolometer thin film and said electrodes; and
    concave or convex sections formed on said lower layer protective film, on the sides of which said bolometer thin film is formed, and
    said beams including:
    wiring material; and
    insulating protective films surrounding the wiring material,
    wherein said convex or concave sections comprises at least two of a first type of a plurality of convex or concave sections formed extending in a direction that crosses an electric current direction in said bolometer thin film, a second type of a plurality of convex or concave sections formed extending in a direction approximately parallel to the electric current direction in said bolometer thin film, and a third type of a plurality of convex or concave sections formed on said lower layer protective film in a dotted manner.

6. A bolometer-type infrared solid-state image sensor, comprising:
   a substrate; and
   a plurality of infrared detecting elements provided above the substrate, which has diaphragm spacing from the substrate and supported by beams,
   said diaphragm including:
   a bolometer thin film;
   electrodes arranged on the both end of the bolometer thin film;
   an upper layer protective film and a lower layer protective film, which are formed so as to sandwich and cover said bolometer thin film and said electrodes; and
   concave or convex sections formed on said lower layer protective film, on the sides of which said bolometer thin film is formed, wherein said sections are formed by insulating material capable of performing selective etching to said lower layer protective film, and
   said beams including:
   wiring material; and
   insulating protective films surrounding the wiring material.

7. The bolometer-type infrared solid-state image sensor according to claim 2, wherein
   said convex sections are formed by insulating material capable of performing selective etching to said lower layer protective film.

8. The bolometer-type infrared solid-state image sensor according to claim 3, wherein
   said convex sections are formed by insulating material capable of performing selective etching to said lower layer protective film.

9. The bolometer-type infrared solid-state image sensor according to claim 4, wherein
   said convex sections are formed by insulating material capable of performing selective etching to said lower layer protective film.

10. The bolometer-type infrared solid-state image sensor according to claim 5, wherein
    said convex sections are formed by insulating material capable of performing selective etching to said lower layer protective film.

11. The bolometer-type infrared solid-state image sensor according to claim 1, wherein conductive material is provided inside said concave or convex sections, and insulating material is provided only at a surface of said concave or convex sections.

* * * * *